Figure 1:
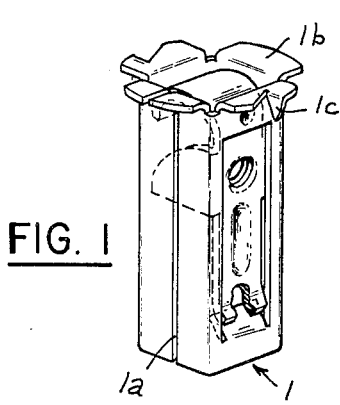

April 7, 1964     H. J. MODREY     3,127,807

HOLLOW WALL ANCHOR WITH PIVOTED ANCHOR MEMBER

Filed Oct. 13, 1961

INVENTOR.
HENRY J. MODREY
BY Hane and Nydick
ATTORNEYS

United States Patent Office 3,127,807
Patented Apr. 7, 1964

3,127,807
HOLLOW WALL ANCHOR WITH PIVOTED
ANCHOR MEMBER
Henry J. Modrey, Eagle Drive, Stamford, Conn.
Filed Oct. 13, 1961, Ser. No. 144,953
7 Claims. (Cl. 85—3)

The present invention relates to wall anchors for supporting, for instance, a fixture on a wall, and more particularly to a hollow wall anchor for mounting in a wall, such as a plasterboard wall, behind which space is available to accommodate the protruding part of the anchor.

Wall anchors of this kind broadly comprise a locking or anchor member which is inserted in a mounting opening in the wall from the front side thereof so that part of the anchor protrudes from the rear side of the wall. The locking or anchor member is then forcibly deformed by means of a screw bolt from a configuration fitting the peripheral outline of the mounting opening to a configuration overhanging the outline of the mounting opening.

One object of the present invention is to provide a novel and improved hollow wall anchor of the general kind above referred to, which is locked to the wall and to the fixture by a single screwing-in of a screw bolt into the anchor inserted in the mounting opening. Such locking of both, the anchor to the wall and the fixture to the anchor, by a single screwing-in operation affords the advantage of reducing the required screw turns to about one-third in comparison with known anchors of this type which require that the screw bolt is first screwed in to lock the anchor to the wall, then screwed out completely for attachment of the fixture and again screwed in to lock the fixture to the anchor.

Another object of the invention is to provide a novel and improved wall anchor of the general kind above referred to, the locking of which does not involve a forcible deformation of any part of the anchor by forcing such part from a configuration fitting the mounting opening into a configuration overhanging the mounting opening. With anchors as heretofore known, such deformation is effected by the aforementioned first screwing-in of the screw bolt which requires the application of a considerable turning force, whereas the single screwing operation required to lock an anchor according to the invention to the wall and the fixture does not involve the application of an appreciable turning force since no anchor part need be deformed by and during the screwing-in operation.

Still another object of the invention is to provide a novel and improved wall anchor of the general kind above referred to which readily permits the use of simple and standard automatic screwdrivers, since turning is effected in one direction only and with out encountering an appreciable resistance for part of the operation. Such standard automatic screwdrivers cannot be used for locking a wall anchor involving the deformation of a part and thus requiring considerable force and also requiring a reversal of the screwing operation for screwing the bolt out of the anchor as explained before.

A further object of the invention is to provide a novel and improved wall anchor of the general kind above referred to which develops very little tendency to turn when the operating screw is tightened. With anchors as heretofore known, this turning tendency is so strong that the anchors are frequently furnished with holes in their top plate into which may be fitted an auxiliary holding tool. The prongs dependent from the top plate do not suffice to prevent turning of such anchors during the deformation step. They will often cut a hole into the usually comparatively soft wall material.

Other and further objects, features and advantages of the invention will be pointed out hereinafter and set forth in the appended claims constituting part of the application.

In the accompanying drawing a preferred embodiment of the invention is shown by way of illustration and not by way of limitation.

Figure 2:
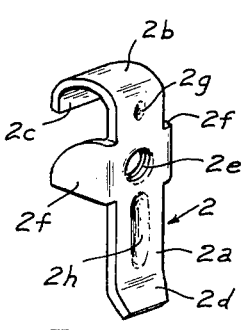
Figure 3:
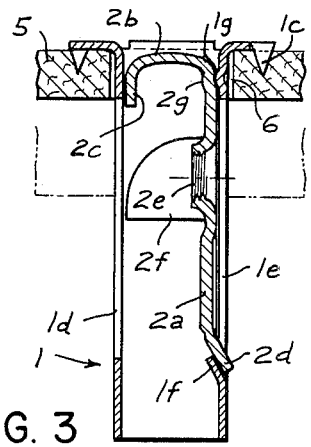
Figure 8:
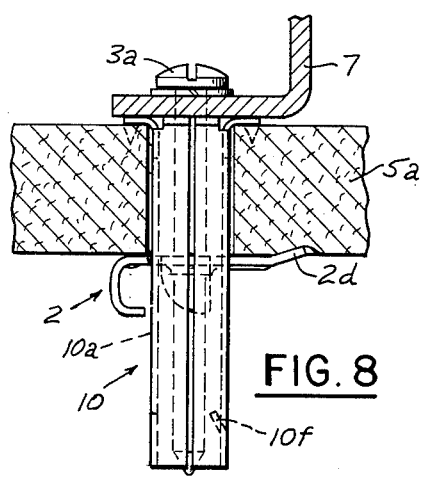
Figure 9:
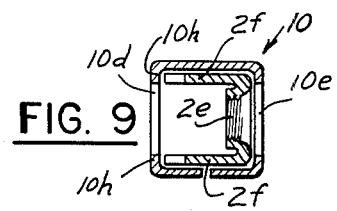

In the drawing:
FIG. 1 is a perspective view of a hollow wall anchor according to the invention.
FIG. 2 is a perspective view of the locking or anchor member of the wall anchor.
FIG. 3 is a sectional elevational view of an anchor inserted in a mounting opening and ready for locking.
FIGS. 4, 5, 6 and 7 are sectional views of successive stages of a locking operation.
FIG. 8 is an elevational view of a modified wall anchor having greater length and capacity than those of FIGS. 1–7, and is shown as being locked to a wall and a fixture, and
FIG. 9 is a section of the wall anchor of FIG. 8.

Referring now to the figures in detail, the exemplified wall anchor comprises a shell 1, a locking or anchor member 2 and an actuating or tightening member 3.

Shell 1 is shown as having a generally rectangular and more specifically a square cross-section. It may be formed from a blank of sheet metal suitably bent together as is indicated by joining line 1a. The tube thus formed is smooth at the end at which it is to be inserted in a wall opening and has at its other end outwardly turned flanges 1b, from which are bent off depending prongs 1c. Prongs 1c serve to prevent turning of the anchor during the tightening operation which will be more fully described hereinafter, by biting into the usually rather soft material of a wall 5, as shown in FIG. 3. However, the turning moment developed by the anchor is so small as to be negligible. Hence, the prongs may be omitted. Two opposite side walls of the shell are formed with slots 1d and 1e; the length of the slots determines the range of thickness of the wall within which an anchor of given dimensions may be mounted, as will be more fully explained hereinafter. An inwardly bent lip, 1f, is provided at the lower end of slot 1e.

The anchor or locking member 2 comprises a long arm 2a and a short arm 2b extending at a substantially right angle from the long arm. The short arm is shown slightly curved and may terminate at its free end in a depending flange 2c. The length of the long arm is in excess of the width of the interior of shell 1 and the width of the short arm fits the width of the shell.

The free end of arm 2a terminates in a lip 2d bent in the direction opposite to that of short arm 2b. Arm 2a includes a threaded bore 2e designed to coact with actuating or tightening member 3 and it further includes guide means in the form of two flanges, 2f, laterally extending from both longitudinal edges of arm 2a in the same direction as arm 2b. The flanges are preferably located at the level of bore 2e and one rim of each flange is rounded from arm 2a toward the tip of the flange.

Long arm 2a may further be formed with a detent 2g yieldably engageable with a protrusion 1g formed in the side wall of shell 1 including slot 1e. Long arm 2a may further be formed with a reinforcing rib 2h.

Actuating or tightening member 3 may be in principle any suitably formed tool, such has a screwdriver or rod which can be inserted in shell 1 for exerting a downward pressure upon short arm 2b. However, in practice it is preferable to employ as member 3 a screw bolt 3a, as such is needed to tighten the anchor to the wall and the fixture.

A wall anchor as hereinbefore described functions as follows:

The wall anchor, assembled as shown in FIG. 1 is inserted in a mounting opening 6 formed in wall 5 which may be visualized as being made of wall board. While shell 1 has a square cross-section, mounting opening 6 may be round. If the wall opening has a diameter approximately equal to the diagonal width of shell 1, the shell can be forced into the mounting opening. It does not affect the efficiency of the wall anchor that the shell does not closely fit the mounting opening. The gaps between the shell and the wall are covered by flanges 1b and any slight rotation of the anchor in reference to the wall is effectively prevented by prongs 1c biting into the wall.

FIG. 3 shows the anchor assembly of FIG. 1 installed in the mounting opening. The long arm 2a of anchor member 2 has a length such that lip 2d overlies lip 1f, which thus forms a guiding surface for long arm 2a. The long arm is located substantaily parallel to the side walls of shell 1 and is retained in that position by flange 2c abutting against the respective side wall of the shell and flanges 2f also resting against or being closely adjacent the respective side walls of shell 1. An accidental or unintentional downward sliding of the anchor member in the shell is prevented by the yieldable engagement between protrusion 1g and detent 2g.

Figure 4:
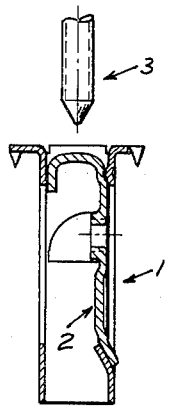
Figure 5:
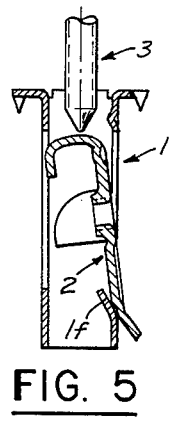
Figure 6:
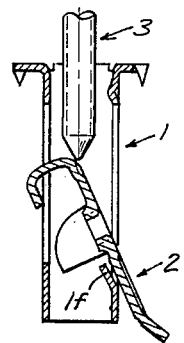
Figure 7:
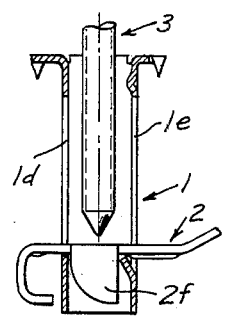

Turning now to FIGS. 4 through 7, FIG. 4 shows the anchor assembly in the postion of FIG. 3. In this position the anchor member is substantially within the peripheral outline of shell 1. This position constitutes the mounting position of the anchor member. To move the anchor member from the position of FIG. 4 into the position of FIG. 7 which constitutes the locking position of the anchor member, a downward pressure overcoming the restraining action of protrusion 1g and detent 2g is exerted upon the anchor member by simply pushing against short arm 2b thereof, by means of actuating member 3. As a result, as shown in FIGS. 5 and 6, the free end of anchor member 2 is guided outwardly by lip 1f, which thus constitutes a fulcrum about which the anchor member is gradually pivoted. In the position of FIG. 7 the anchor member is transverse of the shell and protrudes at both ends from the same through slots 1d and 1e. The anchor member rests upon the lower end of slot 1d and lip 1f at the end of slot 1e. Flanges 2f are located within the shell below the level of rest of member 2, thereby preventing a transverse displacement thereof in reference to the shell.

FIG. 3 indicates the minimum thickness and the maximum thickness of the wall 5 for which an anchor is suitable having the dimension shown in FIG. 3. The range of thickness is determined by the length of slots 1d and 1e. The minimum thickness of the wall must be such that the unslotted portions of the sleeve walls do not protrude beyond the lower side of wall 5, since otherwise the anchor member cannot be tightened against the lower side of the wall as will be explained more fully hereinafter, and the maximum thickness of the wall must be such that there is sufficient space for the anchor member to turn from the position of FIG. 4 into the position of FIG. 7.

In order to tighten the anchor member a screw bolt such as screw bolt 3a is fitted through a fixture to be mounted such as fixture 7 and inserted in bore 2e of the anchor member. The anchor member is then tightened by turning the bolt until the anchor member is pressed against a nd preferably somewhat into the bottom side of panel 5.

The wall anchor according to FIGS. 8 and 9 is designed specifically for mounting in a thick wall. In the previously described embodiment of the invention, the length of sleeve 1, more specifically, the location of lip 1f and the length of anchor 2 are so correlated that lip 2d of the anchor rests on lip 1f when the anchor is in its initial position as shown in FIG. 3 or 4. According to FIG. 8 the thickness of wall 5a is such that a sleeve 10 of substantially greater length than sleeve 1 must be used. Otherwise the design of sleeve 10 is identical with that of sleeve 1, and accordingly, the same reference letters are used. Due to the increased length of sleeve 10, lip 2d of anchor 2 does not reach lip 10f when the anchor is in the position corresponding to the position of FIG. 3. As a result, the anchor must be guided downwardly along the sleeve until its lip 2d engages lip 1f of the sleeve, thereby causing pivoting of the anchor as previously described. Guidance of the anchor is effected by retaining marginal wall portions 10h in the sleeve wall including slot 10d. The flanges 2f of the anchor engage these marginal wall portions 10h thereby guiding and steadying the anchor within the sleeve until the anchor is pushed down sufficiently for instance by the actuating member 3 to permit engagement of lip 2d with lip 2f, whereupon the anchor is pivoted as has been previously described.

The wall portions 10h described in connection with FIGS. 8 and 9 may also be provided in the wall anchor according to FIGS. 1 through 7. However, while in the wall anchor according to FIGS. 1 through 7 the wall portions are useful as guides for the anchor, they are not essential for the function of the anchor as they are in the design according to FIGS. 8 and 9.

While the invention has been described in detail with respect to certain now preferred examples and embodiments of the invention, it will be understood by those skilled in the art, after understanding the invention, that various changes and modifications may be made without departing from the spirit and scope of the invention, and it is intended therefore to cover all such changes and modifications in the appended claims.

What is claimed as new and desired to be secured by Letters Patent is:

I claim:

1. A wall anchor for locking in a mounting opening of wall, said wall anchor comprising an open-ended shell having outwardly turned flanges at one end, said shell being insertable in said mounting opening from one side of the wall whereby the other end of said shell protrudes from the other side of the wall, said shell having lengthwise slots in oppositely disposed side walls extending from adjacent said one end and terminating short of said other end, an inwardly protruding deflective lip at the end of one of said slots adjacent said other end of the shell, an anchor member having a long arm and a short arm extending at a right angle from the long arm at one end thereof, said long arm being longer than the interior width of the shell and having a guide means laterally extending from said long arm at the same side as said short arm and said short arm being of a length corresponding substantially to and fitting the interior width of the shell, said anchor member being slidably inserted into said shell from one end thereof in a mounting position in which said long arm is substantially parallel to the shell wall having the slot terminating in the lip, and locking means inserted into said shell and into pressure engagement with said short arm to displace said anchor member in the shell towards the lip for pivoting said anchor member about said lip from its mounting position into a locking position in which the anchor member is substantially transverse of the shell and protrudes therefrom through said shell slots, said anchor member being provided with means to cooperate with said locking means when said anchor member is in said transverse position whereby said anchor member may engage said other side of said wall, said guide means engaging side wall portions of the shell to guide the member along the wall having the lip and toward the same.

2. A wall anchor according to claim 1, wherein the long arm of said anchor member and the respective side wall of said shell comprise respectively a detent and an engaging nose yieldably restraining slideable displacement of the anchor member along the side walls of the shell.

3. A wall anchor according to claim 1, wherein the long arm of said anchor includes a threaded bore, and wherein said locking means comprises a screw bolt fitting said threaded bore for screwing the bolt into said anchor member in the transverse position thereof to lift said member in the slots toward said one side of the wall and into pressure engagement with the other side of said wall.

4. A wall anchor according to claim 1, wherein the long arm of said anchor member has at its free end a bent off lip extending from said arm outwardly in reference to the short arm, said lip on the long arm being slideably engageable with the lip on the shell to guide the long arm out of the respective slot during movement of the anchor member toward the locking position.

5. A wall anchor according to claim 1, wherein said guide means on the long arm of said anchor member is in the form of two transversely spaced flanges extending from said arm toward the other slotted side wall, said flanges being located closely adjacent to other opposite side walls of the shell in the mounting position of the anchor member to guide the anchor member along said other shell walls while being moved from said mounting position into engagement with said lip and toward said locking position.

6. A wall anchor according to claim 5, wherein said shell has a rectangular cross-section, the slot in the wall opposite the wall having said lip being narrower than the transverse space between said flanges to define lengthwise marginal portions of said wall, said wall portions guiding the flanges during the movement of the anchor member toward and into engagement with the lip to prevent pivoting of the anchor member prior to engagement with the lip.

7. A wall anchor according to claim 6, wherein said flanges are positioned on the long arm of said anchor member intermediate the free end of the long arm and the short arm so as to occupy a position within the shell in the locking position of the anchor member, thereby transversely locking the latter within the shell.

References Cited in the file of this patent

UNITED STATES PATENTS

| | | |
|---|---|---|
| 499,444 | Schumann | June 13, 1893 |
| 2,609,723 | Stubbs | Sept. 9, 1952 |
| 2,908,196 | Apfelzweig | Oct. 13, 1959 |

FOREIGN PATENTS

| | | |
|---|---|---|
| 589,084 | Great Britain | June 11, 1947 |